(12) United States Patent
Kwon et al.

(10) Patent No.: US 12,391,261 B2
(45) Date of Patent: Aug. 19, 2025

(54) APPARATUS AND METHOD FOR INFERRING DRIVING CHARACTERISTICS OF A VEHICLE

(71) Applicant: FOUNDATION OF SOONGSIL UNIVERSITY-INDUSTRY COOPERATION, Seoul (KR)

(72) Inventors: Minhae Kwon, Seoul (KR); Dongsu Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 291 days.

(21) Appl. No.: 17/959,515

(22) Filed: Oct. 4, 2022

(65) Prior Publication Data

US 2023/0406327 A1 Dec. 21, 2023

(30) Foreign Application Priority Data

Jun. 16, 2022 (KR) ........................ 10-2022-0073198

(51) Int. Cl.
| | |
|---|---|
| *B60W 50/00* | (2006.01) |
| *B60W 60/00* | (2020.01) |
| *G05B 13/02* | (2006.01) |
| *G08G 1/01* | (2006.01) |
| *G08G 1/052* | (2006.01) |

(52) U.S. Cl.
CPC ........ *B60W 50/00* (2013.01); *B60W 50/0097* (2013.01); *G05B 13/0265* (2013.01); *G08G 1/0116* (2013.01); *G08G 1/0133* (2013.01); *G08G 1/052* (2013.01); *B60W 60/001* (2020.02); *B60W 2554/4046* (2020.02)

(58) Field of Classification Search
CPC ..... B60W 30/08; B60W 30/095–0956; B60W 40/09; B60W 50/0097; B60W 2050/0029; B60W 60/0027–00276; B60W 2554/4045; B60W 2554/4046; G06N 3/092; G05B 13/0265; G08G 1/0112; G08G 1/0116; G08G 1/0133; G08G 1/052
See application file for complete search history.

(56) References Cited

U.S. PATENT DOCUMENTS

| | | | | |
|---|---|---|---|---|
| 2020/0164891 | A1* | 5/2020 | Bender | ............. B60W 50/0098 |
| 2021/0179118 | A1* | 6/2021 | Alt | .......................... G06N 3/006 |

(Continued)

*Primary Examiner* — Spencer D Patton
(74) *Attorney, Agent, or Firm* — NSIP Law

(57) ABSTRACT

The present disclosure relates to a driving characteristic inference apparatus and method of a vehicle. According to an exemplary embodiment of the present disclosure, a driving characteristic inference method includes observing a target driving vehicle which is an observation target to generate driving data including behavior information of the target driving vehicle, by an observation module; performing reinforcement learning on an artificial intelligence model using learning data including a first driving characteristic coefficient, by a learning module; generating sampled inference behavior data with the driving data and the first driving character coefficient as an input of the artificial intelligence model, by a model utilization module; and comparing the generated inference behavior data with measured actual behavior data to determine the second driving characteristic coefficient, by an inference module.

8 Claims, 4 Drawing Sheets

(56) References Cited

U.S. PATENT DOCUMENTS

| | | | |
|---|---|---|---|
| 2023/0055066 A1* | 2/2023 | Asadi | B60W 50/06 |
| 2023/0096654 A1* | 3/2023 | Salameh | G06V 10/84 |
| | | | 382/156 |
| 2023/0150537 A1* | 5/2023 | Giaccone | B60W 30/18163 |
| | | | 701/23 |

* cited by examiner

[FIG. 1]
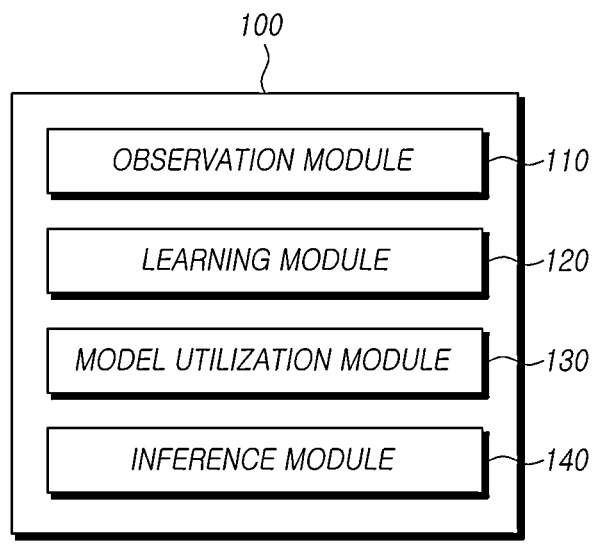
[FIG. 2]
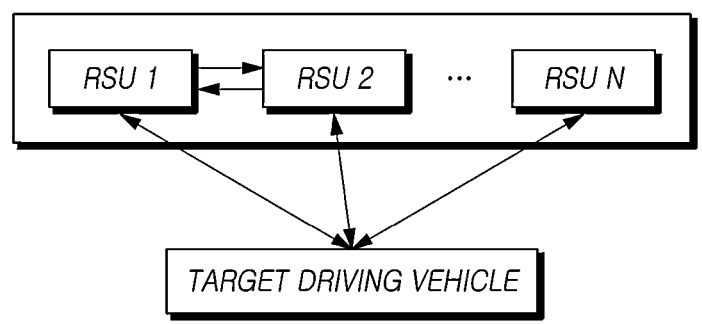

[FIG. 3]
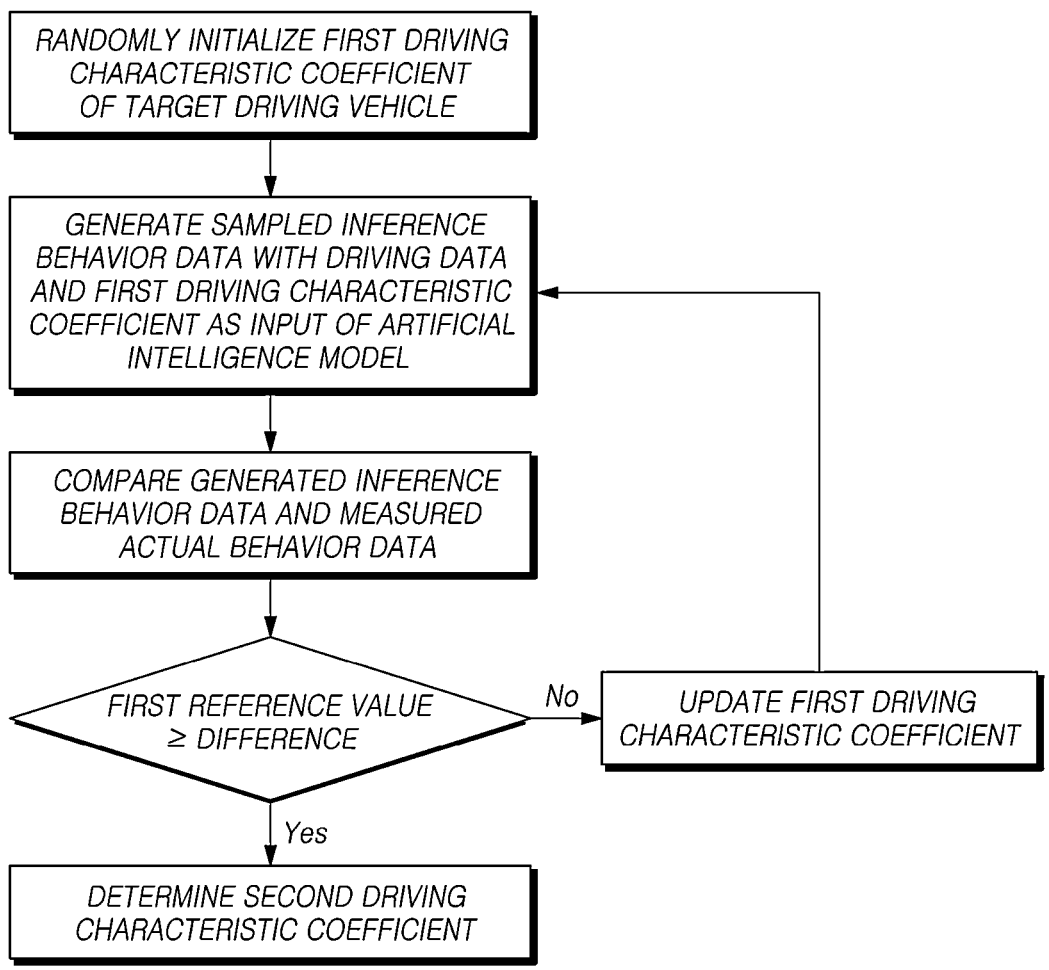

[FIG. 5]
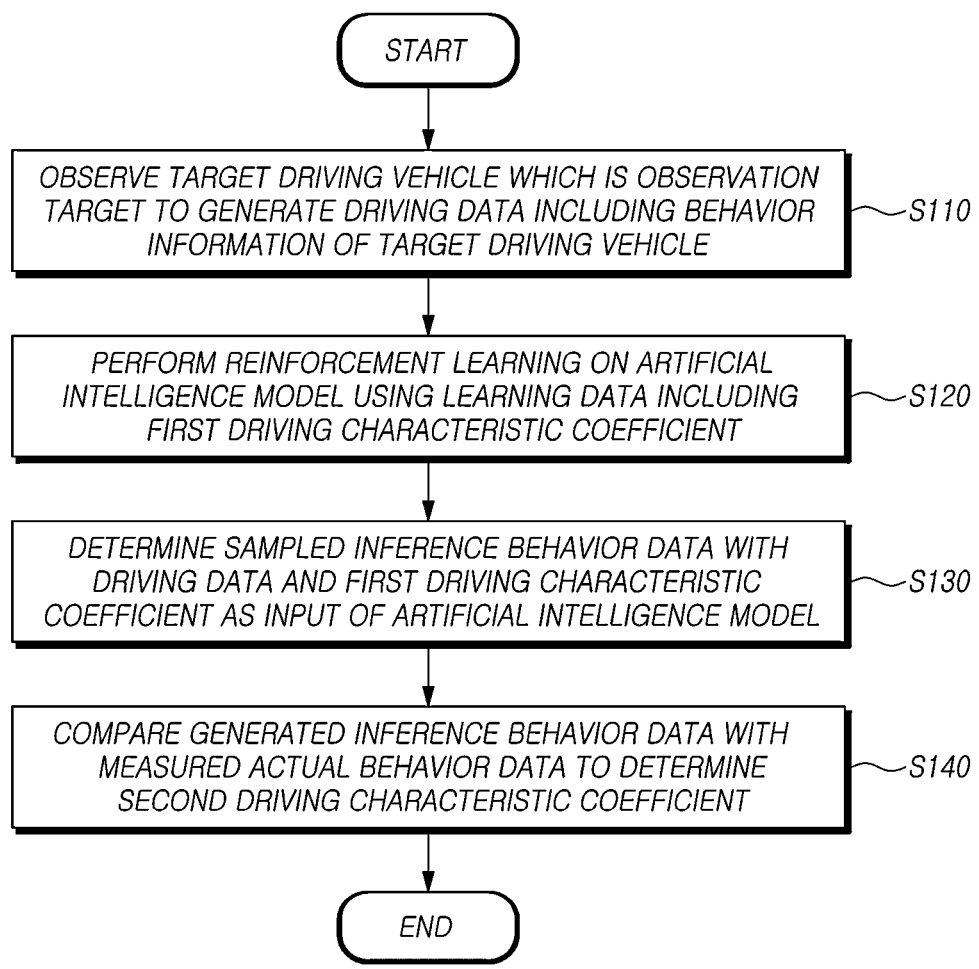

APPARATUS AND METHOD FOR INFERRING DRIVING CHARACTERISTICS OF A VEHICLE

CROSS-REFERENCE TO RELATED APPLICATIONS

This application claims the priority of Korean Patent Application No. 10-2022-0073198 filed on Jun. 16, 2022, in the Korean Intellectual Property Office, the disclosure of which is incorporated herein by reference.

BACKGROUND

Field

The present disclosure relates to an apparatus and a method for inferring the driving characteristics of a vehicle, and more particularly, to a driving characteristic inference apparatus and method which infer the driving characteristics of a vehicle using the maximum likelihood estimation.

Description of the Related Art

In recent years, in accordance with the growth of autonomous driving system technology, discussions on the commercialization of autonomous vehicles are consistently being made. The commercialization of autonomous vehicles will naturally create a road environment in which autonomous vehicles and non-autonomous vehicles are mixed and driven.

When an operation pattern of the driving vehicle is inferred in such a road environment, not only the driving stability of both the human drivers and autonomous vehicles is improved, but also it helps decision-making during the vehicle driving so that various studies to infer an operation pattern of the driving vehicle are being developed.

The Maximum Likelihood Estimation, which is a parametric data density estimation method, is a method for estimating a specific parameter from an observed sample data set.

At this time, the most important element for estimating the specific parameter from the maximum likelihood estimation is optimization so when the optimization is not satisfactorily performed, it is very difficult to estimate an accurate parameter value.

Accordingly, a necessity for a method for accurately inferring an operation pattern of a driving vehicle by the optimization method is demanded.

SUMMARY

An object of the present disclosure is to provide a driving characteristic inference apparatus and method, which accurately infer a driving characteristic of a target driving vehicle using a reinforcement learning based artificial intelligence model.

Further, another object of the present disclosure is to provide a driving characteristic inference apparatus and method, which effectively infer a driving characteristic of a target driving vehicle by gradient descent using Monte Carlo for maximum likelihood estimation.

The object of the present disclosure is not limited to the above-mentioned objects, and other objects and advantages of the present disclosure, which have not been mentioned above, can be understood by the following description and become more apparent from exemplary embodiments of the present disclosure. Further, it is understood that the objects and advantages of the present disclosure may be embodied by the means and a combination thereof in the claims.

According to an aspect of the present disclosure, a driving characteristic inference method includes observing a target driving vehicle which is an observation target to generate driving data including behavior information of the target driving vehicle, by an observation module; performing reinforcement learning on an artificial intelligence model using learning data including a first driving characteristic coefficient which is an arbitrary value, by a learning module; generating sampled inference behavior data with the driving data and the first driving character coefficient as an input of the artificial intelligence model, by a model utilization module; and comparing the generated inference behavior data with measured actual behavior data to determine the second driving characteristic coefficient, by an inference module.

Further, in an exemplary embodiment of the present disclosure, the observation module communicates with the target driving vehicle using a roadside unit (RSU) to collect driving data of the target driving vehicle.

Further, in an exemplary embodiment of the present disclosure, the behavior information of the target driving vehicle includes at least one acceleration information and lane change information of the target driving vehicle.

Further, in an exemplary embodiment of the present disclosure, the learning data further includes speed information of the driving vehicle, driving lane information, relative speed information of the driving vehicle and a surrounding vehicle, and relative position information.

Further, in an exemplary embodiment of the present disclosure, the driving data further includes speed information of the target driving vehicle, driving lane information, relative speed information of the target driving vehicle and a surrounding vehicle, and relative position information.

Further, according to one exemplary embodiment of the present disclosure, the driving characteristic inference method further includes before the generating of the inference behavior data, randomly initializing the first driving characteristic coefficient.

Further, in an exemplary embodiment of the present disclosure, the determining of the second driving characteristic coefficient includes after re-inferring the inference behavior data to update the inference driving characteristic coefficient when the difference between the inference behavior data and the actual behavior data exceeds a predetermined first reference value or does not converge to a second reference value, determining the inference driving characteristic coefficient as a second driving characteristic coefficient when the difference of the inference behavior data and the actual behavior data is equal to or lower than the predetermined first reference value or converges to the predetermined second reference value.

Further, in an exemplary embodiment of the present disclosure, the inference driving characteristic coefficient is calculated by gradient descent using the maximum likelihood estimation.

Further, in an exemplary embodiment of the present disclosure, the inference driving characteristic coefficient is calculated by the following Equation 4.

$$\hat{c}_{k+1} = \operatorname*{argmax}_{c} \sum_{t=1}^{T} \left[ -\left( \frac{1}{2} \ln 2\pi\sigma_\pi^2 + \frac{a_{cct,t} - a^*_{acc,t}}{2\pi\sigma_\pi^2} \right) + \left( a_{lc,t} - a^*_{lc,t} \right) \right] \quad \text{[Equation 4]}$$

Here, $\hat{c}_{k+1}$ is an inference driving characteristic coefficient and $a_{acc,t}$, $a^*_{acc,t}$, $a_{lc,t}$, $a^*_{l,t}$ refer to sampled acceleration information, actual acceleration information, sampled lane change information, and actual lane change information of the target driving vehicle.

Further, according to one aspect of the present disclosure, a driving characteristic inference apparatus includes one or more processors which execute an instruction. One or more processors perform: observing a target driving vehicle which is an observation target to generate driving data including behavior information of the target driving vehicle; performing reinforcement learning on an artificial intelligence model using learning data including a first driving characteristic coefficient; generating sampled inference behavior data with the driving data and the first driving character coefficient as an input of the artificial intelligence model; and comparing the generated inference behavior data with measured actual behavior data to determine the second driving characteristic coefficient.

According to the present disclosure, the driving characteristic inference apparatus and method accurately infer a driving characteristic of a target driving vehicle using a reinforcement learning based artificial intelligence model.

According to the present disclosure, the driving characteristic inference apparatus and method effectively infer a driving characteristic of a target driving vehicle using the maximum likelihood estimation.

BRIEF DESCRIPTION OF THE DRAWINGS

The above and other aspects, features, and other advantages of the present disclosure will be more clearly understood from the following detailed description taken in conjunction with the accompanying drawings in which:

FIG. 1 is a block diagram of a driving characteristic inference apparatus according to an embodiment of the present disclosure;

FIG. 2 is a view illustrating a configuration of an observation module according to an exemplary embodiment of the present disclosure;

FIG. 3 is a flowchart illustrating an operation order of a model utilization module and an inference module according to an exemplary embodiment of the present disclosure;

FIG. 5 is a flowchart of a driving characteristic inferring method according to an embodiment of the present disclosure.

DETAILED DESCRIPTION OF THE EMBODIMENT

Figure 4:
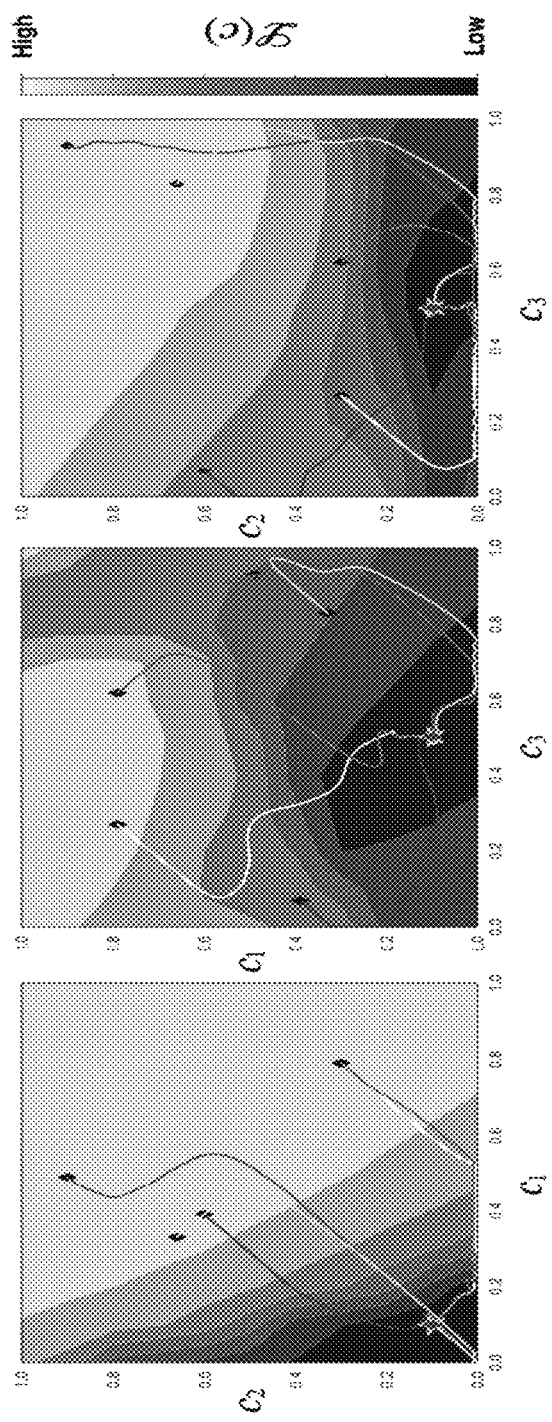
FIG. 4 is a view illustrating a process of determining a second driving characteristic coefficient according to an exemplary embodiment of the present disclosure.

Those skilled in the art may make various modifications to the present disclosure and the present disclosure may have various embodiments thereof, and thus specific embodiments will be illustrated in the drawings and described in detail in the detailed description. However, this does not limit the present disclosure within specific exemplary embodiments, and it should be understood that the present disclosure covers all the modifications, equivalents, and replacements within the spirit and technical scope of the present disclosure. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present disclosure, a first component may be referred to as a second component, and similarly, a second component may be referred to as a first component. A term of and/or includes a combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment but are not intended to limit the present disclosure. A singular form may include a plural form if there is not clearly opposite meaning in the context. In the present disclosure, it should be understood that the terminology "include" or "have" indicates that a feature, a number, a step, an operation, a component, apart, or the combination thereof described in the specification is present but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art and shall not be construed in ideal or excessively formal meanings unless they are clearly defined in the present application.

Hereinafter, an exemplary embodiment of the present disclosure will be described in detail with reference to the accompanying drawings.

FIG. 1 is a block diagram of a driving characteristic inference apparatus according to an embodiment of the present disclosure, FIG. 2 is a view illustrating a configuration of an observation module according to an exemplary embodiment of the present disclosure, and FIG. 3 is a flowchart illustrating an operation order of a model utilization module and an inference module according to an exemplary embodiment of the present disclosure.

Referring to FIG. 1, a driving characteristic inference apparatus 100 is an apparatus for inferring a driving characteristic of a target driving vehicle and includes an observation module 110, a learning module 120, a model utilization module 130, and an inference module 140. Here, the target driving vehicle refers to a vehicle that is driving on the road and is a target of behavior observation.

The observation module 110 observes a target driving vehicle to generate driving data of the target driving vehicle. Here, the driving data is data used as an input to infer a driving characteristic of the target driving vehicle in the inference module to be described below and includes speed information of the target driving vehicle, driving lane information, relative speed information of the target driving vehicle and a surrounding vehicle, relative position information, and behavior information of the target driving vehicle.

Further, the behavior information of the target driving vehicle includes at least one acceleration information and lane change information of the target driving vehicle. However, the behavior information is not necessarily limited thereto and includes all information for figuring out a behavior of the target driving vehicle.

In the meantime, as illustrated in FIG. 2, the observation module 110 communicates with the target driving vehicle using a roadside unit (RSU) to collect driving data of the target driving vehicle. The RSU is a roadside base station and a plurality of RSUs RSU1, RUS2, . . . , RSUN is installed on the roadside to consistently communicate with the target driving vehicle which is moving. For example, when a distance between the target driving vehicle and the RSU1 is long to be out of a communication range of the RSU1, the RSU1 transmits an execution unit by means of wireless communication with the RSU2 to maintain a communication state between the RSU2 and the target driving vehicle.

At this time, the communication between the target driving vehicle and the RSU is performed based on a vehicle to infrastructure (V2I) or vehicle to everything (V2X) technology which is a next-generation intelligence traffic system.

The learning module 120 trains an artificial intelligence model using learning data including a first driving characteristic coefficient. Specifically, the learning module 120 trains the artificial intelligence model by means of a deep reinforcement learning algorithm which is trained to maximize a reward given in the external environment and uses the learning data as an input.

The learning data includes a first driving characteristic coefficient, speed information of the driving vehicle, driving lane information, relative speed information of the driving vehicle and the surrounding vehicle, and relative position information and each information and learning data are plural.

The driving vehicle refers to a vehicle, excluding a target driving vehicle which is an observation vehicle, among vehicles that are driving on the road and the first driving characteristic coefficient is a coefficient representing a general driving characteristic of the driving vehicle and an arbitrary value may be assigned thereto.

Further, the first driving characteristic coefficient includes multi-driving characteristics such as an acceleration change characteristic or a lane change characteristic of the driving vehicle and may refer to a weight for a driving characteristic of each multi-driving characteristic. Accordingly, a high first driving characteristic coefficient may be assigned to a driving characteristic that is determined to have a high weight ratio, among multiple driving characteristics.

The model utilization module 130 generates inference behavior data with driving data collected by the observation module and the first driving characteristic coefficient as an input of the artificial intelligence model.

Specifically, the model utilization module 130 calculates an inference driving characteristic coefficient by means of the driving data and the first driving characteristic coefficient and generates inference behavior data based on the calculated inference driving characteristic coefficient.

That is, different behaviors of the target driving vehicle are sampled depending on a value of the calculated inference driving characteristic coefficient and the model utilization module 130 may generate inference behavior data according to the sampled behavior. Accordingly, the inference behavior data may be utilized as behavior prediction information for a subsequent operation of the target driving vehicle.

Further, the model utilization module 130 randomly initializes the first driving characteristic coefficient before generating inference behavior data.

The model utilization module 130 randomly initializes the first driving characteristic coefficient before generating inference behavior data to generate inference behavior data based on an arbitrary first driving characteristic coefficient without weight bias.

In the meantime, the inference module 140 calculates the inference driving characteristic coefficient using the maximum likelihood estimation.

The inference driving characteristic coefficient using the maximum likelihood estimation may be calculated by the following Equation 1.

$$\hat{c}_{k+1} = \arg\max_c \ln P(o_{1:T}, a_{1:T}|c) \quad \text{[Equation 1]}$$

Here, $\hat{c}_{k+1}$ is an inference driving characteristic coefficient, $O_1$ is driving data obtained by observing a behavior of the target driving vehicle, $a_1$ is an actual action of the target driving vehicle, and c is a first driving characteristic coefficient. Accordingly, $P(O_{1:T}, a_{1:T}|c)$ refers to a likelihood for an action-observation pair of the given driving characteristic coefficient.

Further, Equation 1 may be deployed to Equation 2 for the acceleration information and the lane change information of the target driving vehicle as follows.

$$\ln P(o_{1:T}, a_{1:T}|c) = \sum_{t=1}^{T}[\ln(O(o_t|s_t) + \ln\pi(a_t|o_t; c)] = \quad \text{[Equation 2]}$$

$$\sum_{t=1}^{T}\ln\pi(a_t|o_t; c) = \sum_{t=1}^{T}[\ln\pi(a_{acc,t}|o_t; c) + \ln\pi(a_{lc,t}|o_t; c)]$$

Here, $\ln \pi(a_{acc,t}|o_t;c)$ is a probability distribution of the behavior for a given observation and driving characteristic (acceleration change) and $\ln \pi(a_{lc,t}|o_t; c)$ is a probability distribution of the behavior for a given observation and driving characteristic (lane change).

Further, $\ln \pi(a_{acc,t}|o_t, c)$ and $\ln \pi(a_{lc,t}|o_t; c)$ may be represented by Equation 3.

$$\ln\pi(a_{acc,t}|o_t; c) = -\frac{1}{2}\ln 2\pi\sigma_\pi^2 - \frac{a_{cct,t} - a^*_{acc,t}}{2\pi\sigma_\pi^2} \quad \text{[Equation 3]}$$

$$\ln\pi(a_{lc,t}|o_t; c) = a^*_{lc,t} - a_{lc,t}$$

Here, $a_{acc,t}$, $a^*_{acc,t}$, $a_{lc,t}$, and $a^*_{lc,t}$ refer to sampled acceleration information, actual acceleration information, sampled lane change information, and actual lane change information of the target driving vehicle.

That is, the inference driving characteristic coefficient $\hat{c}_{k+1}$ using the maximum likelihood estimation of Equation 1 may be finally represented by Equation 4.

$$\hat{c}_{k+1} = \arg\max_c \sum_{t=1}^{T}\left[-\left(\frac{1}{2}\ln 2\pi\sigma_\pi^2 + \frac{a_{cct,t} - a^*_{acc,t}}{2\pi\sigma_\pi^2}\right) + \left(a_{lc,t} - a^*_{lc,t}\right)\right] \quad \text{[Equation 4]}$$

As described above, the inference module 140 optimizes the maximum likelihood estimation using gradient descent to calculate an optimal inference driving characteristic coefficient.

Further, the inference module 140 compares the actual behavior data obtained by measuring the actual behavior of the target driving vehicle collected by the observation module 110 and the inference behavior data generated by the model utilization module 130 to determine a second driving characteristic coefficient. Specifically, as illustrated in FIG.

3, when a difference between the calculated inference behavior data of the target driving vehicle and actual behavior data is equal to or lower than a predetermined first reference value, the inference module 140 may determine the inference driving characteristic coefficient as a second driving characteristic coefficient.

If the difference between the calculated inference behavior data and the actual behavior data exceeds the first reference value, the inference module 140 repeats the processes of updating the inference driving characteristic coefficient of the target driving vehicle by the gradient descent, re-inferring the inference behavior data of the vehicle for the updated inference driving characteristic coefficient, and then comparing with the actual behavior data.

According to another exemplary embodiment, when the difference between the calculated inference driving characteristic coefficient and the actual driving characteristic coefficient converges to a predetermined second reference value, the inference module 140 determines the inference driving characteristic coefficient as a second driving characteristic coefficient.

Similarly, if the difference between the calculated inference behavior data and the actual behavior data does not converge to the second reference value, the inference module 140 repeats the processes of updating the inference driving characteristic coefficient of the target driving vehicle by the gradient descent, re-inferring the inference behavior data of the vehicle for the updated inference driving characteristic coefficient and then comparing with the actual behavior data.

As described above, the inference module 140 reflects an actual driving characteristic of the target driving vehicle by means of feedback and repeatedly calculates a new inference driving characteristic coefficient to infer an accurate driving characteristic of the target vehicle.

FIG. 4 is a view illustrating a process of determining a second driving characteristic coefficient according to an exemplary embodiment of the present disclosure.

Referring to the drawings, the brighter the background of the drawing, the larger the difference of the driving characteristic coefficient so it means that the difference between the actual behavior data of the target driving vehicle and the inferred behavior data is large. The darker the background of the drawing, the smaller the difference in the driving characteristic coefficient, which means that the difference between the actual behavior data of the target driving vehicle and the inferred behavior data is small.

Further, the plurality of black diamond shapes indicates the first driving characteristic coefficient which is an initial starting point that is randomly initialized, and the inference driving characteristic coefficient is calculated by a plurality of times of inference and sampling processes to determine the second driving characteristic coefficient.

In the drawing, a star-shaped point is a second driving characteristic coefficient. It is confirmed that all the first driving characteristic coefficients converge to a second driving characteristic coefficient of the dark background in which the difference between the actual behavior data of the target driving vehicle and the inferred behavior data is small by the repeated learning, regardless of the position of the initial starting point.

As a result of an experiment, when 300 times of optimization is repeated for a target driving vehicle having an actual driving characteristic coefficient $c^x=[0.1, 0.1, 0.5]$ by the driving characteristic inference apparatus of the present disclosure, the second driving characteristic coefficient which is a final convergence value is $c_{300}=[0.1002, 0.0999, 0.5000]$ to be inferred as a value very close to the actual driving characteristic coefficient.

FIG. 5 is a flowchart of a driving characteristic inferring method according to an embodiment of the present disclosure.

First, the observation module observes a target driving vehicle which is an observation target to generate driving data including behavior information of the target driving vehicle in S110. Here, the driving data may further include speed information of the target driving vehicle, driving lane information, relative speed information of the target driving vehicle and a surrounding vehicle, and relative position information.

Thereafter, the learning module performs reinforcement learning on an artificial intelligence model using learning data including a first driving characteristic coefficient in S120. Here, the learning data may further include speed information of the driving vehicle, driving lane information, relative speed information of the driving vehicle and a surrounding vehicle, and relative position information.

Further, the model utilization module calculates an inference driving characteristic coefficient with the driving data and the first driving characteristic coefficient as inputs and generates sampled inference behavior data based on the calculated inference driving characteristic coefficient in S130.

Finally, the inference module compares the generated inference behavior data and the measured actual behavior data to determine a second driving characteristic coefficient to infer a driving characteristic of the target driving vehicle in S140.

As described above, according to the present disclosure, the driving characteristic inference apparatus and method accurately infer a driving characteristic of a target driving vehicle using a reinforcement learning based artificial intelligence model.

According to the present disclosure, the driving characteristic inference apparatus and method effectively infer a driving characteristic of a target driving vehicle using the maximum likelihood estimation.

As described above, although the present disclosure has been described with reference to the exemplary drawings, it is obvious that the present disclosure is not limited by the exemplary embodiment and the drawings disclosed in the present disclosure and various modifications may be performed by those skilled in the art within the range of the technical sprit of the present disclosure. Further, although the effects of the configuration of the present disclosure have not been explicitly described while describing the embodiments of the present disclosure, it is natural that the effects predictable by the configuration should also be recognized.

What is claimed is:

1. A driving characteristic inference method, comprising:
  receiving information about a target driving vehicle from a roadside base station;
  generating driving data including behavior information of the target driving vehicle based on information received from the roadside base station;
  performing reinforcement learning on an artificial intelligence model using learning data including a first driving characteristic coefficient which is an arbitrary value;
  generating sampled inference behavior data with the driving data and the first driving characteristic coefficient as an input of the artificial intelligence model;

comparing the generated inference behavior data with measured actual behavior data to determine a second driving characteristic coefficient;

wherein determining the second driving characteristic coefficient comprises:

updating the inference driving characteristic coefficient when the difference of the inference behavior data and the actual behavior data exceeds a predetermined first reference value or does not converge to a second reference value, sampling inference behavior data based on the updated inference driving characteristic coefficient, and determining the inference driving characteristic coefficient as the second driving characteristic coefficient when a difference of the newly inferred inference behavior data and the actual behavior data is equal to or lower than the predetermined first reference value or converges to the predetermined second reference value; and inferring an operation pattern of the target driving vehicle based on the generated inference behavior data.

2. The driving characteristic inference method according to claim 1, wherein the behavior information of the target driving vehicle includes at least one of acceleration information and lane change information of the target driving vehicle.

3. The driving characteristic inference method according to claim 1, wherein the learning data further includes speed information of a driving vehicle, driving lane information, relative speed information of the driving vehicle and a surrounding vehicle, and relative position information.

4. The driving characteristic inference method according to claim 1, wherein the driving data further includes speed information of the target driving vehicle, driving lane information, relative speed information of the target driving vehicle and a surrounding vehicle, and relative position information.

5. The driving characteristic inference method according to claim 1, further comprising:

before the generating of the inference behavior data, randomly initializing the first driving characteristic coefficient.

6. The driving characteristic inference method according to claim 5, wherein the inference driving characteristic coefficient is calculated by the gradient descent using the maximum likelihood estimation.

7. The driving characteristic inference method according to claim 6, wherein the inference driving characteristic coefficient is calculated by the following Equation 4, $$\hat{c}_{k+1} = \underset{c}{\mathrm{argmax}} \sum_{t=1}^{T} \left[ -\left( \frac{1}{2} \ln 2\pi\sigma_\pi^2 + \frac{a_{cct,t} - a^*_{acc,t}}{2\pi\sigma_\pi^2} \right) + \left( a_{lc,t} - a^*_{lc,t} \right) \right] \quad \text{[Equation 4]}$$

Here, $\hat{c}_{k+1}$ is an inference driving characteristic coefficient and $a_{acc,t}$, $a^*_{acc,t}$, $a_{lc,t}$, $a^*_{lc,t}$ refer to sampled acceleration information, actual acceleration information, sampled lane change information, and actual lane change information of the target driving vehicle.

8. A driving characteristic inference apparatus, comprising:

one or more processors which execute an instruction, wherein the one or more processors perform:

receiving information about a target driving vehicle from a roadside base station;

generating driving data including behavior information of the target driving vehicle based on information received from the roadside base station;

performing reinforcement learning on an artificial intelligence model using learning data including a first driving characteristic coefficient;

generating sampled inference behavior data with the driving data and the first driving characteristic coefficient as an input of the artificial intelligence model; and comparing the generated inference behavior data with measured actual behavior data to determine a second driving characteristic coefficient;

wherein determining the second driving characteristic coefficient comprises:

updating the inference driving characteristic coefficient when the difference of the inference behavior data and the actual behavior data exceeds a predetermined first reference value or does not converge to a second reference value, sampling inference behavior data based on the updated inference driving characteristic coefficient, and determining the inference driving characteristic coefficient as the second driving characteristic coefficient when a difference of the newly inferred inference behavior data and the actual behavior data is equal to or lower than the predetermined first reference value or converges to the predetermined second reference value; and inferring an operation pattern of the target driving vehicle based on the generated inference behavior data.

* * * * *